(12) United States Patent
Yamasaki et al.

(10) Patent No.: US 9,353,822 B2
(45) Date of Patent: May 31, 2016

(54) SHOCK ABSORBER AND METHOD FOR MANUFACTURING SHOCK ABSORBER

(71) Applicant: HITACHI AUTOMOTIVE SYSTEMS, LTD., Ibaraki (JP)

(72) Inventors: Jin Yamasaki, Machida (JP); Tetsuo Yoshida, Kawasaki (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 14/367,527

(22) PCT Filed: Dec. 27, 2012

(86) PCT No.: PCT/JP2012/083932
§ 371 (c)(1),
(2) Date: Jun. 20, 2014

(87) PCT Pub. No.: WO2013/100076
PCT Pub. Date: Jul. 4, 2013

(65) Prior Publication Data
US 2014/0339032 A1 Nov. 20, 2014

(30) Foreign Application Priority Data

Dec. 27, 2011 (JP) .................... 2011-285832

(51) Int. Cl.
*F16F 9/32* (2006.01)
*F16F 9/36* (2006.01)
*B23P 19/04* (2006.01)

(52) U.S. Cl.
CPC ................. *F16F 9/369* (2013.01); *B23P 19/04* (2013.01); *F16F 9/325* (2013.01); *Y10T 29/49888* (2015.01)

(58) Field of Classification Search
CPC ............ F16F 9/325; F16F 9/369; B23P 19/04

USPC ............... 29/460, 458; 188/315, 322.2, 266.6
See application file for complete search history.

(56) References Cited

U.S. PATENT DOCUMENTS 4,974,307 A * 12/1990 Uebayashi et al. ............. 29/460
5,398,787 A * 3/1995 Woessner et al. .......... 188/266.6
(Continued)

FOREIGN PATENT DOCUMENTS

| CN | 1162506 | 10/1997 |
| CN | 102032311 | 4/2011 |

(Continued)

OTHER PUBLICATIONS

International Search Report issued Mar. 5, 2013 in International Application No. PCT/JP2012/083932.
(Continued)

*Primary Examiner* — Thomas Irvin
(74) *Attorney, Agent, or Firm* — Wenderoth, Lind & Ponack, L.L.P.

(57) ABSTRACT

A tubular shock absorber including a tubular case protruding from a side of a main body portion of the shock absorber. A piston (5) with a piston rod (6) coupled thereto is inserted in a cylinder sealingly containing oil, and a damping force is generated by controlling a flow of the oil generated by movement of the piston with use of a damping force generation mechanism (25). The damping force generation mechanism is contained in a cylindrical case (26) protruding from a side of an outer tube (3), and the damping force generation mechanism is fixed by threadably attaching a nut member (34) to a male screw portion (50) of the case. An O-ring is disposed between an outer circumferential surface of the case and an inner circumferential surface of the nut member to seal an uncoated male screw portion from the outside.

19 Claims, 3 Drawing Sheets

(56) References Cited

U.S. PATENT DOCUMENTS

| | | | |
|---|---|---|---|
| 5,562,188 A * | 10/1996 | Appelgren | 188/352 |
| 5,960,915 A * | 10/1999 | Nezu et al. | 188/266.6 |
| 6,079,526 A * | 6/2000 | Nezu et al. | 188/266.6 |
| 6,155,391 A * | 12/2000 | Kashiwagi et al. | 188/266.6 |
| 6,182,805 B1 * | 2/2001 | Kashiwagi et al. | 188/266.6 |
| 6,305,512 B1 * | 10/2001 | Heinz et al. | 188/299.1 |
| 6,332,622 B1 | 12/2001 | Nakamura et al. | |
| 6,431,608 B1 | 8/2002 | Kato | |
| 6,743,002 B1 * | 6/2004 | Millar et al. | 418/61.3 |
| 7,028,817 B1 * | 4/2006 | Anderson | 188/322.19 |
| 7,350,628 B2 * | 4/2008 | Adoline | F16F 3/04 188/67 |
| 8,348,027 B2 * | 1/2013 | Murakami | 188/266.6 |
| 8,578,964 B2 * | 11/2013 | Maszull et al. | 137/523 |
| 9,046,145 B2 * | 6/2015 | Murakami et al. | |
| 2009/0242339 A1 * | 10/2009 | Nakadate et al. | 188/266.5 |
| 2011/0073424 A1 * | 3/2011 | Murakami | 188/322.13 |
| 2012/0048666 A1 * | 3/2012 | Murakami | 188/315 |
| 2012/0305348 A1 * | 12/2012 | Katayama et al. | 188/266.2 |
| 2012/0305349 A1 * | 12/2012 | Murakami et al. | 188/266.6 |
| 2013/0341140 A1 * | 12/2013 | Nakajima | 188/315 |
| 2015/0041265 A1 * | 2/2015 | Yamashita | 188/315 |

FOREIGN PATENT DOCUMENTS

| | | |
|---|---|---|
| CN | 202032227 | 11/2011 |
| JP | 2000-309215 | 11/2000 |
| JP | 2000-320426 | 11/2000 |
| JP | 2001-20830 | 1/2001 |
| JP | 2011-75060 | 4/2011 |
| WO | 2011/099143 | 8/2011 |

OTHER PUBLICATIONS

Office Action dated May 20, 2015 in corresponding Japanese patent application No. 2013-551806 (with partial English translation).

Office Action dated Mar. 30, 2015 in corresponding Chinese patent application No. 201280065141.0 (with English translation).

* cited by examiner

SHOCK ABSORBER AND METHOD FOR MANUFACTURING SHOCK ABSORBER

BACKGROUND OF THE INVENTION

1. Technical Field

The present invention relates to a shock absorber configured to generate a damping force by controlling a flow of hydraulic fluid in a cylinder during a stroke of a piston rod, and a method for manufacturing the shock absorber.

2. Description of the Related Art

As discussed in, for example, Japanese Patent Application Public Disclosure No. 2011-75060, there are tubular shock absorbers mountable on suspension apparatuses of vehicles such as automobiles, each of which is configured in such a manner that a cylindrical member protrudes from a side wall of a main body portion of the shock absorber including a cylinder, and a damping force generation mechanism including a valve, a solenoid, and the like is contained inside this cylindrical member. Then, in the shock absorber discussed in JP 2011-75060, a cylindrical nut member is threadably engaged with a screw portion formed on an outer circumference of a distal end portion of the cylindrical member, thereby fixing the damping force generation mechanism contained inside the cylindrical member.

SUMMARY OF THE INVENTION

1. Technical Problem

According to the shock absorber discussed in JP 2011-75060, because the cylindrical member containing the damping force generation mechanism is provided on a side surface of the cylinder, the cylindrical member is easily exposed to water and dust so that rust is easily formed on the uncoated screw portion due to entry of the water, the dust, and the like.

An object of the present invention is to provide a shock absorber capable of preventing foreign objects such as water and dust from entering an area in the vicinity of a screw portion, and a method for manufacturing this shock absorber.

2. Solution to the Problem

To achieve the above-described object, one aspect of the present invention is a shock absorber including:

a cylinder sealingly containing hydraulic fluid;

a piston inserted in the cylinder;

a piston rod coupled to the piston and extending outwardly from the cylinder;

a damping force generation mechanism configured to generate a damping force by controlling a flow of the hydraulic fluid, which is generated by a sliding movement of the piston in the cylinder;

a tubular case protruding from a side of a main body portion of the shock absorber including the cylinder;

a case side screw portion formed on an outer circumferential portion of the case;

a tubular threadably engageable member with a screw portion, which is threadably engaged with the case side screw portion, formed on an inner circumferential portion thereof; and an annular seal member provided between the outer circumferential portion of the case and the threadably engageable member side screw portion on the inner circumference of the threadably engageable member to seal the case side screw portion and the threadably engageable member side screw portion from an outside.

Further, another aspect of the present invention is a method for manufacturing the above-described shock absorber in which an annular seal groove is formed on the outer circumferential portion of the case and the seal member is fitted in the seal groove, the method including:

fitting the seal member in the annular groove of the case;

masking the male screw portion by externally fitting a mask member, which includes a tubular portion having an inner circumferential surface configured to closely contact the seal member fitted in the seal groove, around the case; and coating the outer circumferential portion of the case.

Advantageous Effects of the Invention

According to the present invention, it is possible to prevent foreign objects such as water and dust from entering the area of the screw portion.

REFERENCE SIGNS LIST

Figure 1:
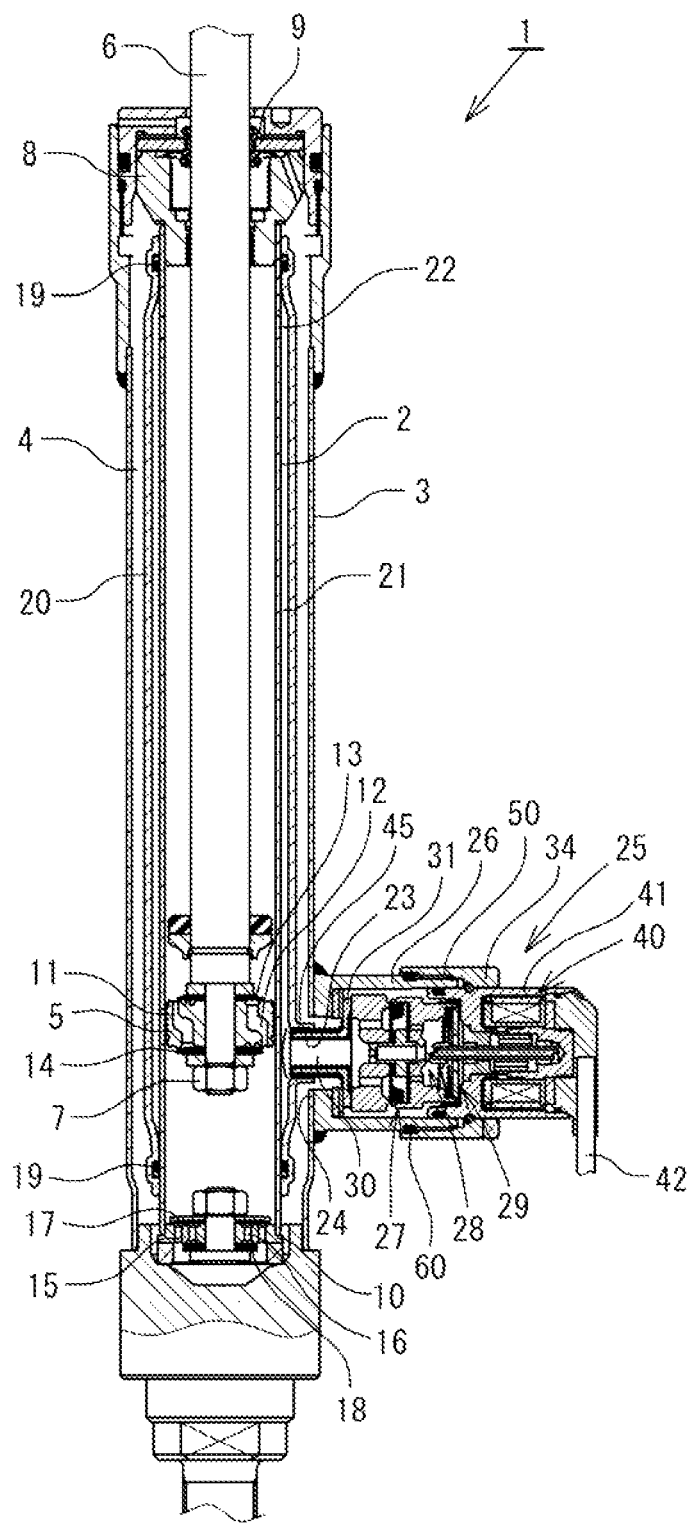
FIG. 1 is a vertical cross-sectional view illustrating a shock absorber according to an embodiment of the present invention.

1 shock absorber
2 cylinder
3 outer tube (main body portion of shock absorber)
5 piston
6 piston rod
25 damping force generation mechanism
26 case
34 nut member (threadably engageable member)
50 male screw portion
60 O-ring (seal member)

DETAILED DESCRIPTION OF THE INVENTION

Figure 2:
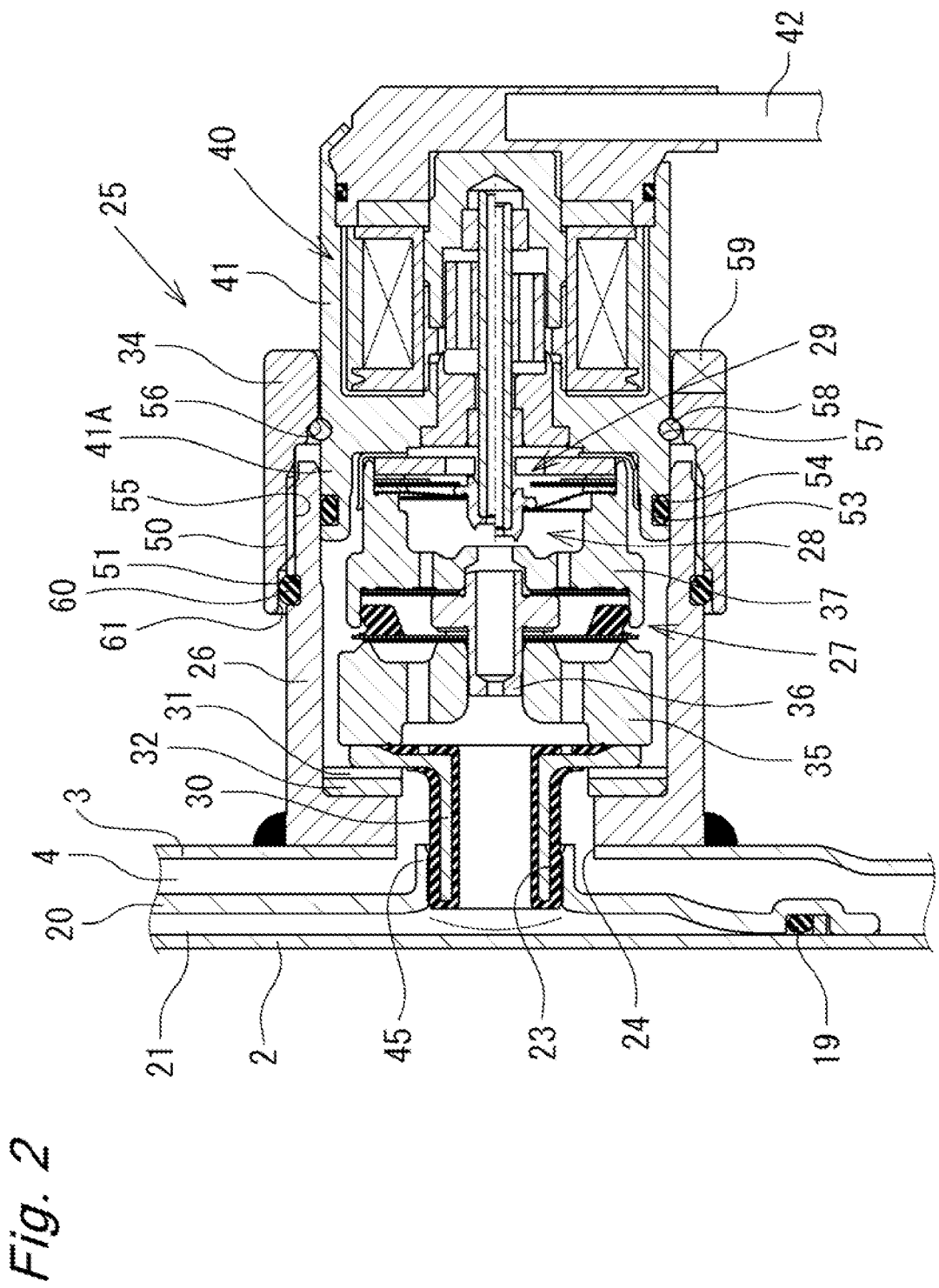
FIG. 2 is an enlarged vertical cross-sectional view illustrating a damping force generation mechanism, which is a main part of the shock absorber illustrated in FIG. 1.

In the following description, an embodiment of the present invention will be described in detail with reference to the drawings. As illustrated in FIGS. 1 and 2, a shock absorber 1 according to the present embodiment is a tubular damping force adjustable hydraulic shock absorber, and has a dual-tube structure or twin-tube configuration including an outer tube 3 outside a cylinder 2 with an annular reservoir 4 defined between the cylinder 2 and the outer tube 3. A piston 5 is slidably fittedly inserted in the cylinder 2, and the interior of the cylinder is divided by the piston 5 into two chambers, a cylinder upper chamber 2A and a cylinder lower chamber 2B. One end of the piston rod 6 is coupled to the piston 5 by a nut 7, while an opposite end side of the piston rod 6 extends through the cylinder upper chamber 2A, is inserted through a rod guide 8 and an oil seal 9 attached to upper ends of the cylinder 2 and the outer tube 3, and protrudes outwardly from the cylinder 2. A base valve 10, which separates the cylinder lower chamber 2B and the reservoir 4, is provided at a lower end portion of the cylinder 2.

Passages 11 and 12, which establish communication between the cylinder upper and lower chambers 2A and 2B, are formed through the piston 5. Then, a check valve 13, which allows only a flow of fluid from the cylinder lower chamber 2B to the cylinder upper chamber 2A, is provided in the passage 12, and a disk valve 14, which is opened when a fluid pressure in the cylinder upper chamber 2A reaches a predetermined pressure to release it to the cylinder lower chamber 2B, is provided in the passage 11.

Passages 15 and 16, which establish communication between the cylinder lower chamber 2B and the reservoir 4, are formed through the base valve 10. Then, a check valve 17, which allows only a flow of the fluid from the reservoir 4 to the cylinder lower chamber 2B, is provided in the passage 15, and a disk valve 18, which is opened when a fluid pressure in the cylinder lower chamber 2B reaches a predetermined pressure to release it to the reservoir 4, is provided in the passage 16. Oil is sealingly contained in the cylinder 2 as hydraulic fluid, and oil and gas are sealingly contained in the reservoir 4.

A separator tube 20 is externally fitted around the cylinder 2 via seal members 19 at both the upper and lower ends of the cylinder 2, and an annular passage 21 is defined between a side wall of the cylinder 2 and a cylindrical side wall of the separator tube 20 disposed around an outer circumference of the cylinder 2. The annular passage 21 is in communication with the cylinder upper chamber 2A via a passage 22 formed through the side wall of the cylinder 2 near the upper end thereof. A substantially cylindrical small-diameter branch tube 45, which includes a connection port 23 in communication with the annular passage 21, protrudes at a lower portion of the side wall of the separator tube 20. Further, a large-diameter inlet port 24 is opened through a side wall of the outer tube 3 substantially concentrically with the branch tube 45. A damping force generation mechanism 25 is mounted on the inlet port 24 at the side wall of the outer tube 3.

The damping force generation mechanism 25 is disposed within a cylindrical or tubular case 26 protruding from the side of the outer tube 3 constituting a main body portion of the shock absorber including the cylinder 2. The case 26 is mounted on the inlet port 24 of the outer tube 3, and contains therein a pilot type (back-pressure type) main valve 27, and a pilot valve 28 that is a pressure control valve configured to control a valve opening pressure of the main valve 27 and to be driven by a solenoid. Further, a failure valve 29, which operates when a failure occurs, is disposed on a downstream side of the pilot valve 28. Then, a connection tube 30 is liquid-tightly inserted in the connection port 23 of the branch tube 45 of the separator tube 20. Due to this configuration, the oil is introduced from the connection port 23 into the connection tube 30, and is delivered into a chamber 26A surrounded by the case 26 via the main valve 27, the pilot valve 28, and the failure valve 29. The oil in the chamber 26A is transmitted into the reservoir 4 via a passage 31 defined at an end of the case 26 and the inlet port 24 of the outer tube 3.

At this time, a damping force is generated by controlling the flow of the oil with use of the pilot valve 28 before the main valve 27 is opened, and a damping force is generated mainly by the main valve 27 when the main valve 27 is opened. Further, a part of the oil on an upstream side of the pilot valve 28 is introduced into a back-pressure chamber 80 defined behind the main valve 27, thereby causing an inner pressure in the back-pressure chamber to act on the main valve 27 in a valve closing direction. The damping force can be adjusted by adjusting a control pressure of the pilot valve 28 based on a current supplied to a solenoid 40 via a lead 42, as a result of which, the inner pressure in the back-pressure chamber is changed so that the valve opening pressure and the opening degree of the main valve 27 can be adjusted. Further, when the vehicle stops while waiting for a traffic light or when a failure occurs in the power supply to the solenoid 40 unexpectedly, the failure valve 29 is closed so as to limit the flow of the oil instead of the pilot valve 28 placed into a constantly opened state in this case, thereby preventing an excessive reduction in the damping force to maintain the damping force at an appropriate level.

The connection tube 30, a spacer 32 defining the passage 31, the main valve 27, a main body 35 where the pilot valve 28 and the failure valve 29 are formed, a pilot pin 36 and a pilot body 37, and a solenoid case 41 (a fitted member) containing the solenoid 40 are inserted in the case 26, and they are fixed by threadably engaging a nut member 34, which is a threadably engageable member, with an opening side of the case 26 to thereby apply an axial force thereto.

Next, a configuration where the case 26 and the solenoid case 41 of the damping force generation mechanism 25 are coupled with each other will be described in further detail. A male screw portion 50 is formed on an outer circumferential portion of the opening of the case 26. A seal groove 53 is formed on an outer circumferential portion of a cylindrical portion 41A of the solenoid case 41, which is inserted so as to be fitted in the case 26. An O-ring 54, which is a main seal member, is fitted in the seal groove 53, and the O-ring 54 seals between the case 26 and the solenoid case 41. The nut member 34 is substantially cylindrical, and a female screw portion 55, which is threadably engaged with the male screw portion 50 of the case 26, is formed on an inner circumferential surface of the nut member 34 on one end side that is externally fitted around the case 26. Further, an engagement portion 56, which is a stepped portion having a reduced diameter so as to place the nut member 34 into slidable contact or close contact with the outer circumferential surface of the solenoid case 41, is formed on the inner circumferential portion of the nut member 34 on an opposite end side. An annular engagement groove 57 is formed on the outer circumferential portion of the solenoid case 41 so as to be located opposite from the engagement portion 56 of the nut member 34, and an inner circumferential portion of a retaining ring 58 circularly shaped in cross-section is fitted in the engagement groove 57. Then, inserting the solenoid case 41 into the case 26, and threadably engaging the female screw portion 55 of the nut member 34 to fasten the nut member 34 causes the engagement portion 56 of the nut member 34 to be engaged with an outer circumferential portion of the retaining ring 58, thereby causing the solenoid case 41 to be pressed axially. As a result, an axial force is applied to the connection tube 30, the spacer 32, the main body 35, the pilot pin 36, and the pilot body 37 inserted in the case 26, thereby achieving their fixation. An engagement portion 59 for engaging a tool for fastening the nut member 34 is formed on the opposite end side of the nut member 34.

An annular seal groove 51 is formed on the outer circumferential surface of the case 26 at a position adjacent to a proximal end side of the male screw portion 50. An O-ring 60, which is a seal member, is fitted in the seal groove 51. A seal surface 61 is formed on the inner circumferential portion of the nut member 34 on the one end side at a position adjacent to a distal end side of the female screw portion 55 and opposite from the seal groove 51 of the case 26. Then, when the nut member 34 is threadably attached to the case 26, the O-ring 60 is pressed by the seal surface 61, thereby sealing between the outer circumferential surface of the case 26 and the inner circumferential surface of the nut member 34.

An operation of the thus-configured present embodiment will be described next. The shock absorber 1 is mounted between two relatively movable members such as between a sprung side (a vehicle body side) and an unsprung side (a wheel side) of a suspension apparatus of a vehicle with the piston rod 6 oriented upwardly and the base valve 10 oriented downwardly, and the lead 42 is connected to a control apparatus.

During an extension stroke of the piston rod 6, a movement of the piston 5 in the cylinder 2 causes the check valve 13 of the piston 5 to be closed, and before the disk valve 14 is opened, the fluid in the cylinder upper chamber 2A is pressurized to be transmitted through the passage 22 and the annular passage 21 to be introduced into the inlet passage 30 of the damping force generation mechanism 25 from the connection port 23 of the separator tube 20. Then, the fluid introduced from the inlet passage 30 is delivered into the chamber 26A surrounded by the case 26 via the main valve 27, the pilot valve 28, and the failure valve 29, and is further supplied into the reservoir 4 via the passage 31 defined at the end of the case 26 and the inlet port 24 of the outer tube 3.

At this time, the fluid is fed from the reservoir 4 into the cylinder lower chamber 2B by an amount corresponding to the movement of the piston 5 while opening the check valve 17 of the base valve 10. When the pressure in the cylinder upper chamber 2A reaches a valve opening pressure of the disk valve 14 of the piston 5, the disk valve 14 is opened to release the pressure in the cylinder upper chamber 2A into the cylinder lower chamber 2B, thereby preventing an excessive increase in the pressure in the cylinder upper chamber 2A.

During a compression stroke of the piston rod 6, a movement of the piston 5 in the cylinder 2 causes the check valve 13 of the piston 5 to be opened and the check valve 17 in the passage 15 of the base valve 10 to be closed, and before the disk valve 18 is opened, the fluid in the cylinder lower chamber 2B is introduced into the cylinder upper chamber 2A while the fluid is fed from the cylinder upper chamber 2A into the reservoir 4 via the same route as the above-described extension stroke by an amount corresponding to the entry of the piston rod 6 into the cylinder 2. When the pressure in the cylinder lower chamber 2B reaches a valve opening pressure of the disk valve 18 of the base valve 10, the disk valve 18 is opened to release the pressure in the cylinder lower chamber 2B into the reservoir 4, thereby preventing an excessive increase in the pressure in the cylinder lower chamber 2B.

In this manner, during both the extension and compression stokes of the piston rod 6, at the damping force generation mechanism 25, a damping force is generated by the pilot valve 28 before the main valve 27 is opened (a low piston speed region), and a damping force is generated according to the opening degree of the main valve 27 after the main valve 27 is opened (a high piston speed region). Then, the damping force can be adjusted by adjusting the control pressure of the pilot valve 28 based on a current supplied to the solenoid 40, as a result of which, the inner pressure in the back-pressure chamber is changed so that the valve opening pressure and the opening degree of the main valve 27 can be adjusted. Further, when the vehicle stops at a traffic light or when a failure occurs in the power supply to the solenoid 40 unexpectedly, the failure valve 29 is closed so as to limit the flow of the oil instead of the pilot valve placed into a constantly opened state in this case, thereby succeeding in preventing an excessive reduction in the damping force to maintain the damping force at an appropriate level.

The O-ring 60 is disposed between the case 26 and the nut member 34 of the damping force generation mechanism 25, by which the male screw portion 50 and the female screw portion 55, threadably attaching the case 26 and the nut member 34 to each other, are sealed from the outside so that it is possible to prevent foreign objects such as water and dust from entering an area in the vicinity of the uncoated male screw portion 50 and female screw portion 55 from the outside. Then, it is possible to prevent rust and corrosion from being formed on the male screw portion 50 and the female screw portion 55. On the other hand, the opposite side of the male screw portion 50 and the female screw portion 55 from the O-ring 60 can have only a small space generated between the nut member 34 and the retaining ring 58 due to the engagement between the retaining ring 58 and the engagement portion 56, and a small-diameter portion of the nut member 34 that has a somewhat long axial length (a seal length), whereby it is also possible to prevent foreign objects such as water and dust from entering there. Further, even when foreign objects such as water and dust enter from between the nut member 34 and the retaining ring 58, the O-ring 54 seals between the case 26 and the solenoid case 41, and thereby it is possible to prevent foreign objects such as water and dust from entering the case 26.

Figure 3:
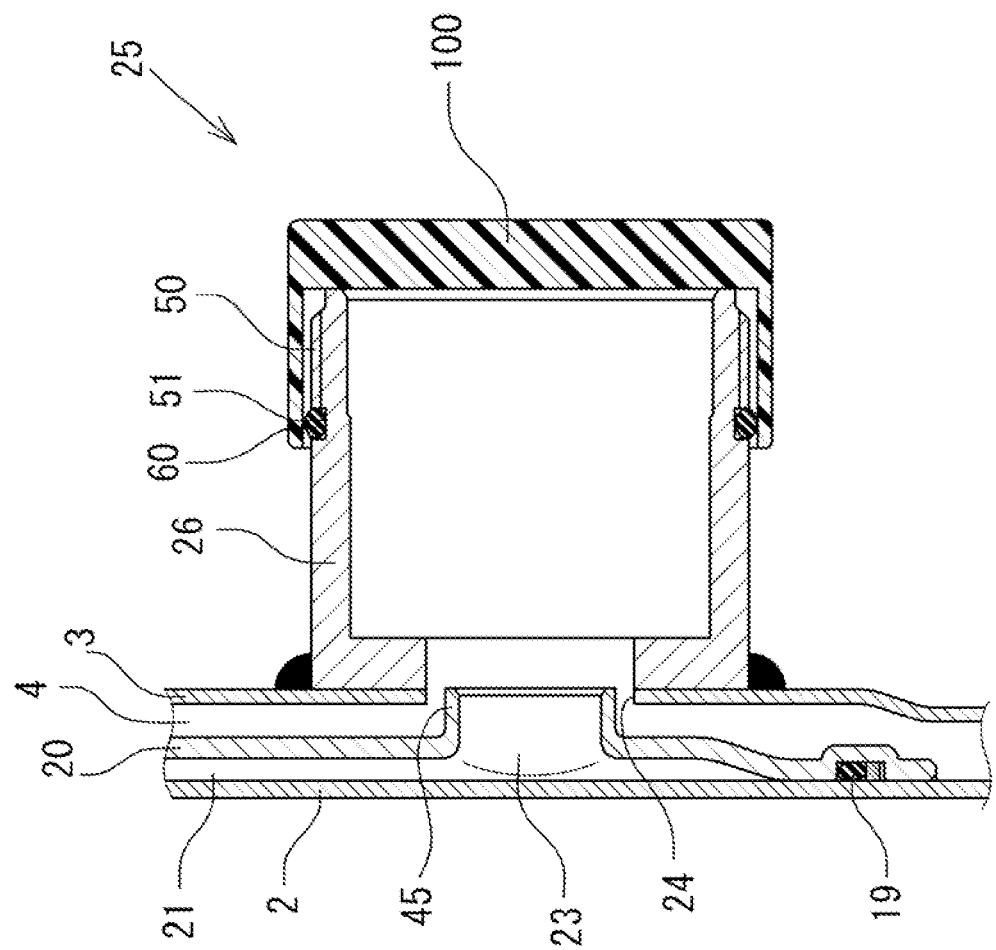
FIG. 3 is a vertical cross-sectional view illustrating a process for manufacturing the damping force generation mechanism, which is a main part of the shock absorber illustrated in FIG. 1.

Next, a process for manufacturing the shock absorber 1 will be described. The outer tube 3 with the case 26 integrally attached thereto by welding or the like is coated by electrodeposition coating such as cation electrodeposition coating. At this time, masking is performed so as to prevent a coating material from attaching to the interiors of the outer tube 3 and the case 26 and the male screw portion 50 on the outer circumferential portion of the case 26. The male screw portion 50 is masked by fitting the O-ring 60 in the seal groove 51, covering the male screw portion 50 with a substantially bottomed cylindrical masking member 100 as illustrated in FIG. 3, and placing an inner circumferential surface of a cylindrical portion of the masking member 100 into close contact with the O-ring 60. A material stretchable and endurable against heat at the time of the coating, such as a silicon resin, can be arbitrarily selected for the masking member 100. Subsequently, electrodeposition coating is performed by immersing the masked outer tube 3 and case 26 in an electrodeposition tank. In this manner, masking at the time of the coating can be performed with the use of the O-ring 60.

After the coating operation, the respective parts are installed in the outer tube 3. Further, the connection tube 30, the spacer 32, the main body 35, the pilot pin 36, the pilot body 37, and the solenoid case 41 are inserted into the case 26, and then the nut member 34 is threadably engaged with the case 26 to apply an axial force to thereby fix these respective parts. The connection tube 30, the spacer 32, the main body 35, the pilot pin 36, the pilot body 37, and/or the solenoid case 41 may be arbitrarily preassembled in the case 26 as a subassembly.

In this manner, the O-ring 60 can function as a mask at the time of the coating during the process for manufacturing the shock absorber 1, and can further function as a seal for the uncoated male screw portion 50 and female screw portion 55 to prevent rust and corrosion from being formed thereon after the shock absorber 1 is completed.

In the above-described embodiment, the seal groove 51 for the O-ring 60 may be formed on the nut member 34 instead of forming it on the case 26. However, in this case, when the outer tube 3 and the case 26 are being coated, a seal means should be provided on the masking member side to substitute for the O-ring 60. However, it is more preferable to form the seal groove 51 on the case 26, because this can eliminate the necessity of detaching the O-ring from the masking member and installing it on the case 26 again after the O-ring 26 is installed in the seal groove 51. The above-described embodiment has been described based on the example in which the present invention is employed for a dual-tube structure or twin-tube type damping force adjustable shock absorber by way of example, but the present invention is not limited thereto and can be employed for another type of shock absorber as long as the shock absorber includes members corresponding to the outer tube 3 (the main body portion of the shock absorber) and the case 26.

Further, the case side screw portion is formed as a male screw, and the threadably engageable member side screw portion is formed as a female screw, but conversely, the case side screw portion may be formed as a female screw, and the threadably engageable member side screw portion may be formed as a male screw. However, it is more desirable in terms of productivity to form the case side screw portion as a male screw and the threadably engageable member side screw portion as a female screw.

The invention claimed is:

1. A method for manufacturing a shock absorber, the shock absorber comprising:
    a cylinder sealingly containing hydraulic fluid;
    a piston inserted in the cylinder;
    an outer tube disposed outside the cylinder;
    a piston rod coupled to the piston and extending outwardly from the cylinder; and
    a damping force generation mechanism configured to generate a damping force by controlling a flow of the hydraulic fluid, which is generated by a sliding movement of the piston in the cylinder,
    wherein the damping force generation mechanism includes:
    a tubular case protruding outwardly from a side of the outer tube, the tubular case including a case side screw portion formed on an outer circumferential portion of the case;
    a tubular threadably engageable member with a screw portion, which is threadably engaged with the case side screw portion, formed on an inner circumferential portion thereof; and
    an annular seal member provided between the outer circumferential portion of the case and the inner circumferential portion of the threadably engageable member to seal the case side screw portion and a threadably engageable member side screw portion from an outside of the damping force generation mechanism,
    wherein an annular seal groove is formed on the outer circumferential portion of the case, and the seal member is fitted in the seal groove,
    the method comprising:
    fitting the seal member in the seal groove of the case;
    preparing a mask member including a tubular portion having an inner circumferential surface;
    a first seal step in which the mask member is externally fitted around the case to mask the case side screw portion with the inner circumferential surface of the tubular portion in close contact with the seal member fitted in the seal groove to prevent a coating material from entering between the mask member and the case by providing a seal between the mask member and the case with the seal member;
    coating the outer circumferential portion of the case after the first seal step; and
    a second seal step in which the threadably engageable member is threadably engaged with the case to provide a seal between the outer circumferential surface of the case and the inner circumferential surface of the threadably engageable member with the same seal member, after the coating step, to prevent a foreign object from entering between the case and the threadably engageable member.

2. The method for manufacturing the shock absorber according to claim 1, wherein the outer circumferential portion of the case is at least partially coated, and the male screw portion is uncoated.

3. The method for manufacturing the shock absorber according to claim 2, wherein the shock absorber further comprising:
    a fitted member fitted in the case and fixed to the case by the threadably engageable member; and
    an annular main seal member provided between an inner circumferential portion of the case and an outer circumferential portion of the fitted member.

4. The method for manufacturing the shock absorber according to claim 2, wherein the case side screw portion comprises a male screw, and the threadably engageable member side screw portion comprises a female screw.

5. The method for manufacturing the shock absorber according to claim 2, wherein the coating includes carrying out electrodeposition coating by immersing the outer tube and the masked case in an electrodeposition tank.

6. The method for manufacturing the shock absorber according to claim 1, wherein the shock absorber further comprises:
    a fitted member fitted in the case and fixed to the case by the threadably engageable member; and
    an annular main seal member provided between an inner circumferential portion of the case and an outer circumferential portion of the fitted member.

7. The method for manufacturing the shock absorber according to claim 6, wherein the case side screw portion comprises a male screw, and the threadably engageable member side screw portion comprises a female screw.

8. The method for manufacturing the shock absorber according to claim 6, wherein the coating includes carrying out electrodeposition coating by immersing the outer tube and the masked case in an electrodeposition tank.

9. The method for manufacturing the shock absorber according to claim 1, wherein the case side screw portion comprises a male screw, and the threadably engageable member side screw portion comprises a female screw.

10. The method for manufacturing the shock absorber according to claim 9, wherein the coating includes carrying out electrodeposition coating by immersing the outer tube and the masked case in an electrodeposition tank.

11. The method for manufacturing the shock absorber according to claim 1, wherein the coating includes carrying out electrodeposition coating by immersing the outer tube and the masked case in an electrodeposition tank.

12. The method for manufacturing the shock absorber according to claim 1, wherein the seal groove is formed adjacently to the case side screw portion between the case side screw portion and the outer tube,
    wherein the inner circumferential portion of the threadably engageable member that is sealed by the seal member serves as a seal surface, and is formed adjacently to a distal end side of the threadably engageable member side screw portion.

13. The method for manufacturing the shock absorber according to claim 12, wherein the case is coated on the outer circumferential portion thereof except for the masked portion, and the case side screw portion is uncoated.

14. The method for manufacturing the shock absorber according to claim 13, wherein the shock absorber further comprising:
    a fitted member fitted in the case and fixed to the case by the threadably engageable member; and an annular main seal member provided between an inner circumferential portion of the case and an outer circumferential portion of the fitted member.

15. The method for manufacturing the shock absorber according to claim 14, wherein the case side screw portion comprises a male screw, and the threadably engageable member side screw portion comprises a female screw.

16. The method for manufacturing the shock absorber according to claim 15, wherein the coating includes carrying out electrodeposition coating by immersing the outer tube and the masked case in an electrodeposition tank.

17. The method for manufacturing the shock absorber according to claim 12, wherein the shock absorber further comprising:
   a fitted member fitted in the case and fixed to the case by the threadably engageable member; and
   an annular main seal member provided between an inner circumferential portion of the case and an outer circumferential portion of the fitted member.

18. The method for manufacturing the shock absorber according to claim 12, wherein the case side screw portion comprises a male screw, and the threadably engageable member side screw portion comprises a female screw.

19. The method for manufacturing the shock absorber according to claim 12, wherein the coating includes carrying out electrodeposition coating by immersing the outer tube and the masked case in an electrodeposition tank.

* * * * *